United States Patent
Hur

(10) Patent No.: US 9,131,439 B2
(45) Date of Patent: Sep. 8, 2015

(54) METHOD AND APPARATUS FOR CONTROLLING POWER AT BASE STATION IN A COMMUNICATION SYSTEM

(75) Inventor: Suk-Kyun Hur, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 336 days.

(21) Appl. No.: 12/968,753

(22) Filed: Dec. 15, 2010

(65) Prior Publication Data

US 2011/0143814 A1   Jun. 16, 2011

(30) Foreign Application Priority Data

Dec. 15, 2009   (KR) .................. 10-2009-0124935

(51) Int. Cl.
*H04M 1/00*   (2006.01)
*H04W 52/02*   (2009.01)
*H04W 88/08*   (2009.01)

(52) U.S. Cl.
CPC .............. *H04W 52/02* (2013.01); *H04W 88/08* (2013.01)

(58) Field of Classification Search
CPC .. H04W 52/02; H04W 88/08; H04W 28/0221

USPC ...................... 455/561, 13.4, 127.1
See application file for complete search history.

(56) References Cited

U.S. PATENT DOCUMENTS

| | | | |
|---|---|---|---|
| 7,076,250 B2* | 7/2006 | Gustafsson | 455/436 |
| 2002/0085502 A1* | 7/2002 | Chheda et al. | 370/252 |
| 2003/0140147 A1* | 7/2003 | Gavish et al. | 709/227 |
| 2008/0045139 A1* | 2/2008 | Chen et al. | 455/3.04 |
| 2008/0102897 A1* | 5/2008 | Song et al. | 455/562.1 |
| 2008/0200178 A1* | 8/2008 | Hamabe | 455/452.1 |
| 2008/0259801 A1* | 10/2008 | Kim et al. | 370/235 |

* cited by examiner

*Primary Examiner* — Wayne Cai
(74) *Attorney, Agent, or Firm* — Jefferson IP Law, LLP

(57) ABSTRACT

A method and apparatus for controlling power of a Base Station (BS) in a wireless communication system are provided, in which a voltage comparator compares an operation voltage of a power control target of the BS with a minimum required voltage for the power control target, and a controller decreases the operation voltage of the power control target by a predefined level, if the operation voltage is higher than the minimum required voltage, and increases the operation voltage of the power control target by a predefined level, if the operation voltage is lower than the minimum required voltage.

13 Claims, 5 Drawing Sheets

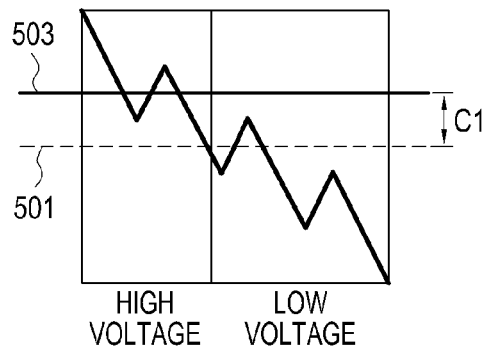
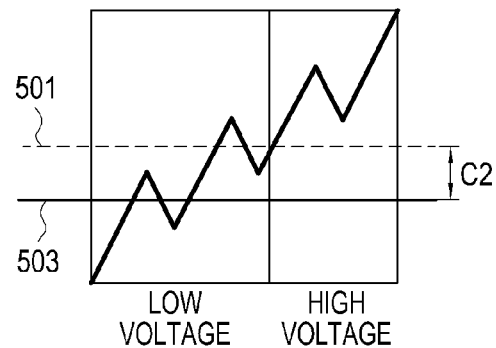
FIG.5A    FIG.5B
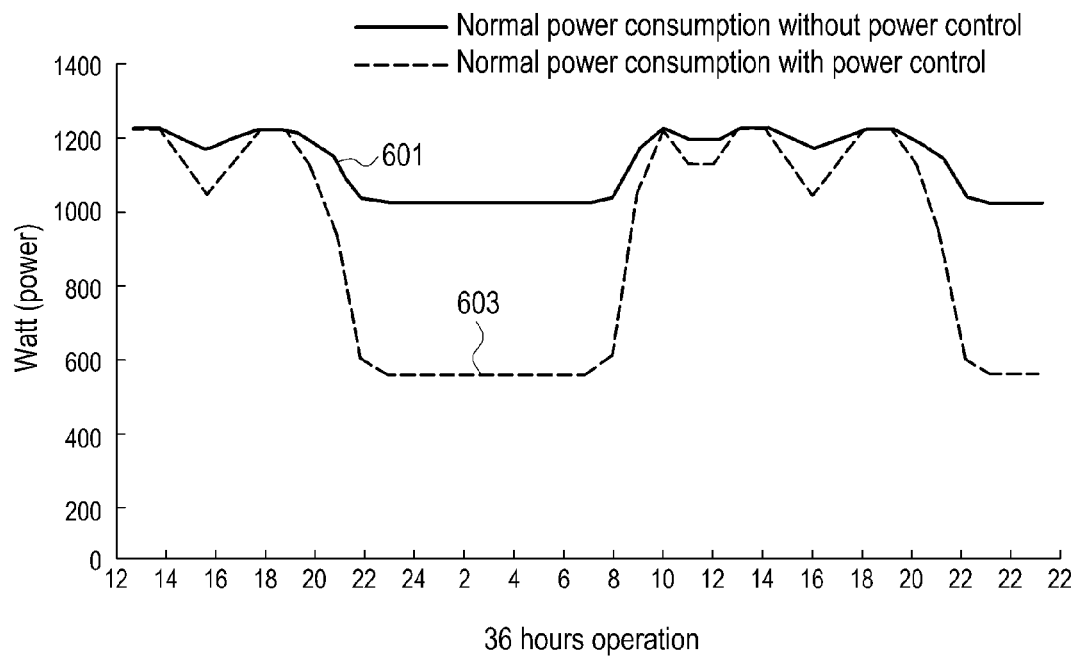
FIG.6

METHOD AND APPARATUS FOR CONTROLLING POWER AT BASE STATION IN A COMMUNICATION SYSTEM

PRIORITY

This application claims the benefit under 35 U.S.C. §119(a) of a Korean patent application filed in the Korean Intellectual Property Office on Dec. 15, 2009 and assigned Serial No. 10-2009-0124935, the entire disclosure of which is hereby incorporated by reference.

BACKGROUND OF THE INVENTION

1. Field of the Invention

The present invention relates to a method and apparatus for controlling power of a Base Station (BS) in a wireless communication system. More particularly, the present invention relates to a method and apparatus for controlling power consumption of the BS in the wireless communication system.

2. Description of the Related Art

In a wireless communication system, a Base Station (BS) consumes a lot of power when performing traffic transmission and reception in order to provide a stable communication service to a large number of subscriber terminals within its service area. Along with the growth of large-capacity data services, such as a multimedia service, the power consumption of the BS has been correspondingly increasing. Therefore, research is being conducted on techniques to reduce the power consumption of the BS.

For the most part, the power consumption of the BS is attributed to an amplifier that amplifies signals. While there are notable achievements in the research on increasing the amplification efficiency of the amplifier, there is a need for research on power control of the BS according to the variations of transmitted and received traffic. In fact, the traffic requirements of users for the BS fluctuate between the day and the night on a daily basis.

FIG. 1 is a graph illustrating traffic load variations over time at a BS according to the related art.

Referring to FIG. 1, reference numeral 101 denotes a curve illustrating a traffic load corresponding to the traffic requirements of users that rapidly increases during the day and rapidly decreases at night.

However, the amplifier of the BS constantly amplifies received signals and thus consumes a similar amount of power irrespective of the higher traffic loads during the day or the lower traffic loads during the night. In this case, electrical stress and thermal stress imposed on the hardware of the BS decreases the lifetime of components of the BS. As a result, the Mean Time Between Failure (MTBF) of the BS is reduced.

Recently, a technique for reducing the average power consumption of the BS by directly manipulating the power supply of the amplifier according to traffic-changing time zones by a BS operator has been proposed.

FIG. 2 is a graph illustrating power consumption over time at the BS according to the related art.

Referring to FIG. 2, reference numeral 201 denotes a curve illustrating normal power consumption when the BS operator supplies a maximum amount of power to the amplifier during the day, which is when a lot of power is needed, and a reduced amount of power to the amplifier in time zones in which less power is needed. However, the power control technique based on the BS operator's manipulation does not allow for a fast enough response to a change in traffic and thus the usefulness of its implementation is limited.

While power consumption of the BS amplifier has been described above, it is also desirable to efficiently reduce the power consumption of other components such as a channel card and a main processor in the BS.

SUMMARY OF THE INVENTION

An aspect of the present invention is to address at least the above-mentioned problems and/or disadvantages and to provide at least the advantages described below. Accordingly, an aspect of the present invention is to provide a power control method and apparatus for efficiently reducing power consumption of a Base Station (BS) in a wireless communication system.

Another aspect of the present invention is to provide a power control method and apparatus for reducing power consumption of a BS according to traffic variations over time in a wireless communication system.

In accordance with an aspect of the present invention, a power control method of a BS in a wireless communication system is provided. The method includes an operation voltage of a power control target of the BS is compared with a minimum required voltage for the power control target, the operation voltage of the power control target is decreased by a predefined level, if the operation voltage is higher than the minimum required voltage, and the operation voltage of the power control target is increased by a predefined level, if the operation voltage is lower than the minimum required voltage.

In accordance with another aspect of the present invention, a power control apparatus of a BS in a wireless communication system is provided. The apparatus includes a voltage comparator compares an operation voltage of a power control target of the BS with a minimum required voltage for the power control target, and a controller decreases the operation voltage of the power control target by a predefined level, if the operation voltage is higher than the minimum required voltage, and increases the operation voltage of the power control target by a predefined level, if the operation voltage is lower than the minimum required voltage.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 5A and 5B are graphs referred to for describing a compensation parameter according to an exemplary embodiment of the present invention; and FIG. 6 is a graph illustrating results of a simulation performed to verify a power consumption effect of a power control method according to an exemplary embodiment of the present invention.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A power control scheme for reducing power consumption of a BS according to an exemplary embodiment of the present invention will be described below, referring to an amplifier of the BS as an example. It is to be clearly understood that the power control scheme is not limited to the BS amplifier. For instance, other components consuming a significant amount of power, such as a channel card or a main processor at the BS, can be power-controlled in the same manner according to the power control scheme of an exemplary embodiment of the present invention.

In the exemplary embodiment of the present invention, the power consumption of the amplifier at the BS is controlled through control of the operation voltage of the amplifier. Similarly, the power consumption of the channel card or the main processor may be controlled by controlling its operation voltage. Hereinbelow, components requiring power control such as an amplifier that consumes a significant amount of power of a BS, a channel card, and a main processor are referred to as power consumption devices (or power control targets). For the sake of convenience, the following description is given in the context of an amplifier as a power consumption device of a BS.

Figure 1:
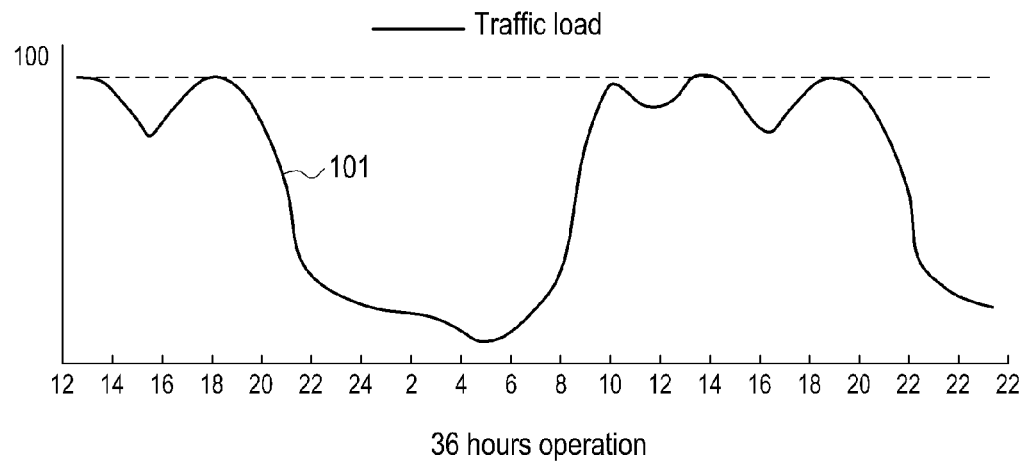
FIG. 1 is a graph illustrating traffic load variations over time at a Base Station (BS) according to the related art.
Figure 2:
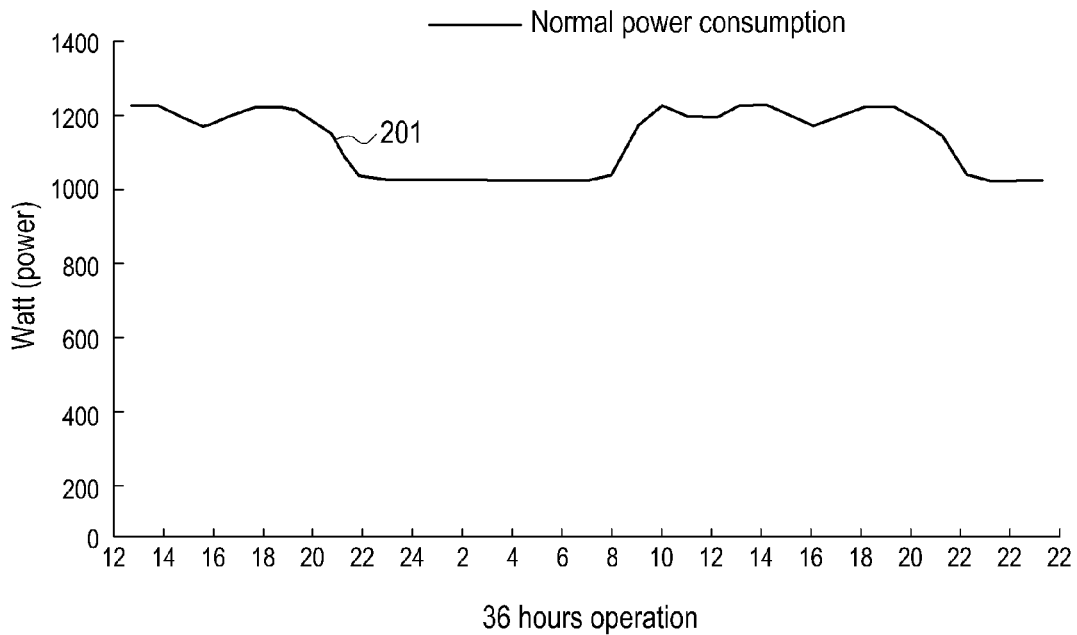
FIG. 2 is a graph illustrating power consumption over time at the BS according to the related art.
Figure 3:
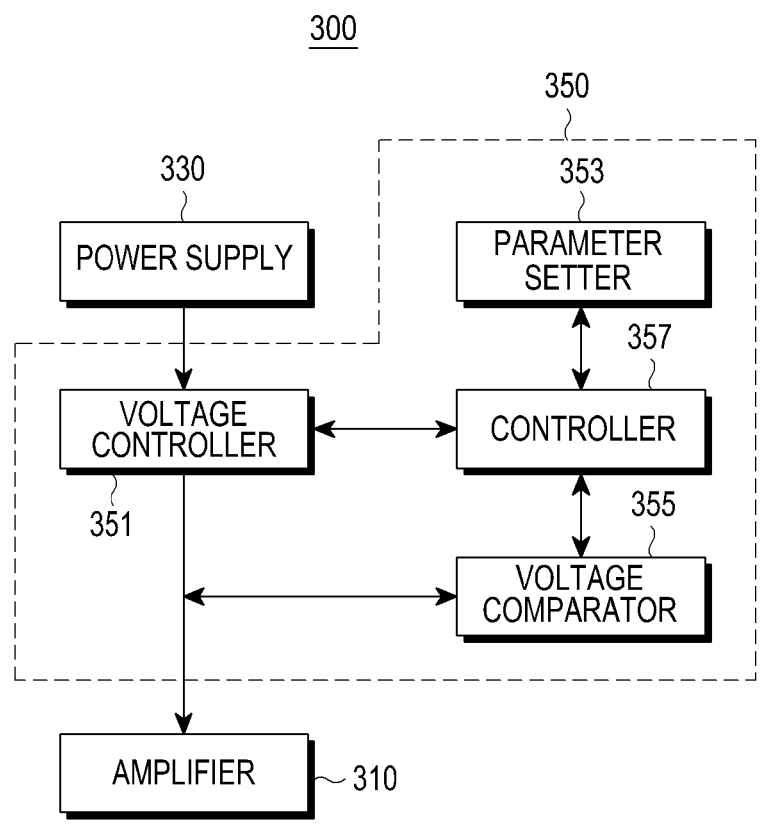
FIG. 3 is a block diagram of a power control apparatus for controlling power of an amplifier at a BS according to an exemplary embodiment of the present invention.

FIG. 3 is a block diagram of a power control apparatus for controlling power of an amplifier at a BS according to an exemplary embodiment of the present invention.

Referring to FIG. 3, only an amplifier 310, a power supply 330 for supplying an operation voltage to the amplifier 310, and a power control apparatus 350 for controlling the operation voltage of the amplifier 310 according to time zones predefined based on traffic variations between the amplifier 310 and the power supply 310 are shown as components of a BS 300, for the convenience in explanation.

A conventional amplifier and power supply may be used as the amplifier 310 and the power supply 330, respectively.

The power control apparatus 350 includes a voltage controller 351, a parameter setter 353, a voltage comparator 355, and a controller 357. The voltage controller 351 increases, decreases, or maintains a supply voltage received from the power supply 330 and outputs the increased, decreased or maintained supply voltage as an operation voltage for the amplifier 310. The amplifier 310 is assumed to include a power transistor (not shown) that receives the operation voltage from the voltage controller 351 as its drain voltage.

Accordingly, the drain bias of the power transistor changes according to the operation voltage. Thus, control of the operation voltage according to a traffic variation leads to control of the power consumption of the amplifier 310 according to the traffic variation.

While a power transistor has a fixed drain bias in an amplifier of a conventional BS, the power consumption of the amplifier 310 can be controlled by controlling its operation voltage according to time zones set based on traffic variations according to an exemplary embodiment of the present invention. For example, since a power requirement for the amplifier 310 increases in a time zone having a large amount of traffic, the operation voltage of the amplifier 310 is increased by a predefined level. On the other hand, the power requirement of the amplifier 310 decreases in a time zone having a small amount of traffic and thus its operation voltage is decreased by a predefined level. In this manner, the power consumption of the amplifier 310 is controlled.

While it has been described that the power consumption of the amplifier 310 is controlled by controlling the drain bias of the power transistor in an exemplary embodiment of the present invention, various other active electrical devices are available instead of the power transistor as far as they are capable of increasing or decreasing the power consumption of the amplifier 310 according to the operation voltage of the amplifier 310.

The parameter setter 353 sets a minimum required voltage for the amplifier 310 for each time zone defined based on a traffic variation, as a parameter for power control of the amplifier 310. In addition, the parameter setter 353 sets a compensation parameter with which to update the minimum required voltage in order to ensure stability in increasing or decreasing the operation voltage with respect to an instantaneous traffic variation. When the operation voltage is decreased, the compensation parameter is set to increase the minimum required voltage, whereas when the operation voltage is increased, the compensation parameter is set to decrease the minimum required voltage. In the case where the amplifier 310 operates at a predefined operation voltage irrespective of traffic variations, the parameter setter 353 sets the operation voltage of the amplifier 310.

The parameter setter 353 may receive at least one of the minimum required voltage, the compensation parameter, and the predefined voltage from a BS operator, or may refer to a table for the minimum required voltage, the compensation parameter, and a predefined voltage for each time zone. An initial minimum required voltage, an initial compensation parameter, and an initial operation voltage are preset, and the minimum required voltage may be updated periodically using the compensation parameter according to the power control method according to an exemplary embodiment of the present invention which will be described later.

In an exemplary embodiment of the present invention, power control of the amplifier 310 is performed in a manual mode, a forced mode, or a scheduling mode.

In the manual mode, the operation voltage of the amplifier 310 is set to the predefined voltage irrespective of a traffic variation or is maintained. To be more specific, the manual mode includes a forced mode and a non-forced mode. The forced mode refers to forced setting of the operation voltage of the amplifier 310 to the predefined voltage. In the non-forced mode, if the set voltage is lower than the minimum required voltage, the current operation voltage of the amplifier 310 is maintained without setting the operation voltage of the amplifier 310 to the predefined voltage, and if the set voltage is equal to or higher than the minimum required voltage, the operation voltage of the amplifier 310 is set to the predefined voltage, in order to prevent determination errors of the BS operator in the manual mode.

In the scheduling mode, the operation voltage of the amplifier 310 is controlled periodically or non-periodically according to time zones set based on traffic variations, to thereby control the power consumption of the amplifier 310. The minimum required voltage is updated using the compensation parameter and the operation voltage of the amplifier 310 is increased or decreased according to a comparison between the operation voltage and the minimum required voltage, in the scheduling mode. That is, the power control according to an exemplary embodiment of the present invention is performed in the scheduling mode which will be described later.

The voltage comparator 355 compares the magnitude of a predefined voltage with the magnitude of a minimum required voltage or the magnitude of an operation voltage with the magnitude of the minimum required voltage in the manual mode, forced mode or scheduling mode and provides the comparison result to the controller 357. The controller 357 provides overall control to the voltage controller 351, the parameter setter 353, and the voltage comparator 355. In addition, the controller 357 performs power control differently according to the manual mode, the forced mode, and the scheduling mode. The BS operator preliminarily sets one of the manual mode, the forced mode, and the scheduling mode for the controller 357. Alternatively, if a traffic variation exceeds a predefined threshold, the controller 357 may select the scheduling mode and if a traffic variation is equal to or less than the predefined threshold, the controller 357 may select the forced or non-forced mode of the manual mode.

Figure 4A:
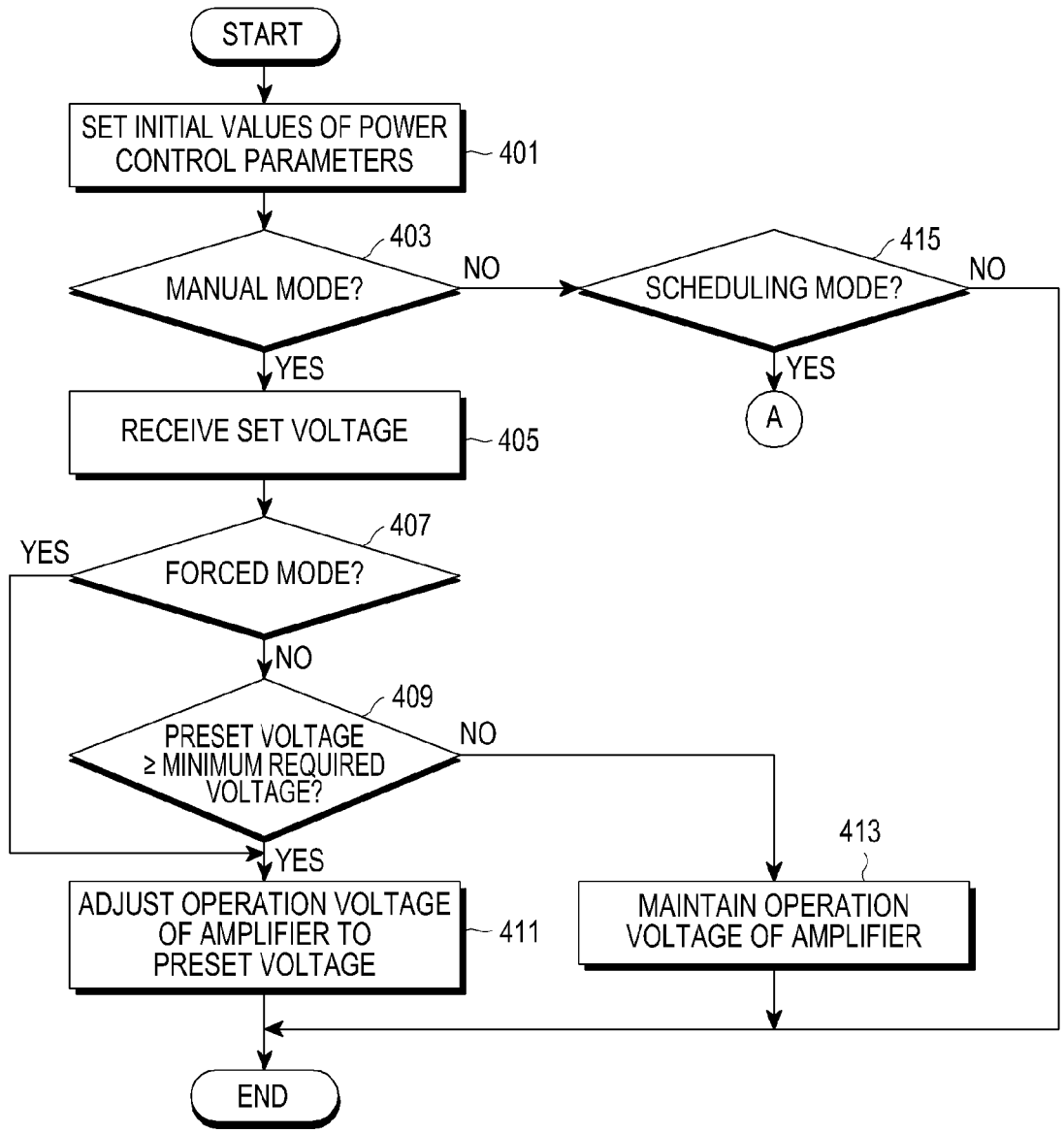
FIGS. 4A and 4B are flowcharts illustrating a power control method according to an exemplary embodiment of the present invention.
Figure 4B:
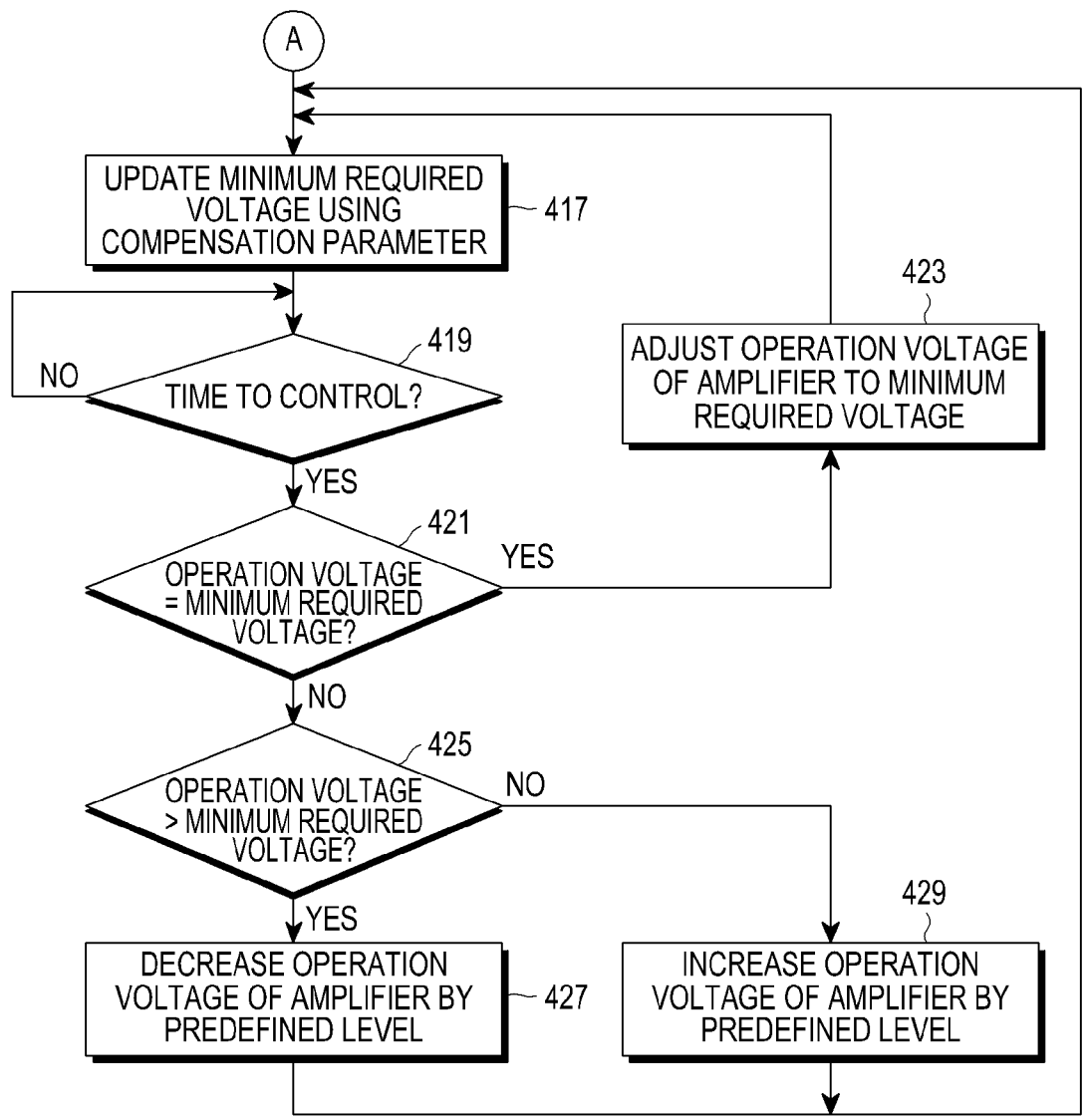

FIGS. 4A and 4B are flowcharts illustrating a power control method according to an exemplary embodiment of the present invention. The controller 357 of FIG. 3 controls the operation voltage of the amplifier 310 according to the power control method depicted in FIGS. 4A and 4B.

Referring to FIGS. 4A and 4B, the parameter setter 353 of FIG. 3 sets an initial minimum required voltage, an initial compensation parameter, and an initial operation voltage as power control parameters by receiving at least one of a minimum required voltage, a compensation parameter, and a predefined operation voltage, or referring to a table, in step 401.

If the manual mode is set for controlling the operation voltage of the amplifier 310 in step 403, the controller 357 receives the set voltage from the parameter setter 353 in step 405 and determines whether the forced mode has been set in step 407. If the forced mode has not been set, that is, the non-forced mode has been set, the controller 357 compares the set voltage with the minimum required voltage in step 409. If the set voltage is equal to or higher than the minimum required voltage, the controller 357 controls the voltage controller 351 to adjust the operation voltage of the amplifier 310 to the set voltage in step 411. Thus, a supply voltage applied by the power supply 330 is controlled to the set voltage at the voltage controller 351 and then applied to the amplifier 310.

On the other hand, if the set voltage is lower than the minimum required voltage in step 409, the controller 357 controls the voltage controller 351 to maintain the current operation voltage of the amplifier 310 in step 413. Meanwhile, if the forced mode has been set in step 407, the controller 357 controls the voltage controller 351 to adjust the operation voltage of the amplifier 310 to the set voltage in step 411.

The manual mode of steps 403 to 413 may be performed upon request of the BS operator or based on the determination of the controller 357, depending on whether a traffic variation is within a predefined threshold. The manual mode may be performed as a one-off process according to settings of the BS operator. The non-forced mode operation of the manual mode is intended to prevent a determination error of the BS operator when an operation voltage is set for the amplifier 310. Specifically, although the operation voltage of the amplifier 310 may be adjusted to the set voltage according to the determination of the BS operator, if the set voltage is lower than a voltage actually required for the amplifier 310, the controller 357 maintains the current operation voltage of the amplifier 310. The current operation voltage refers to the actually required voltage. During the non-forced mode operation, the controller 357 may output a predefined error message through a display to the BS operator.

It is assumed herein that the manual mode operation is a one-off operation set by the BS operator and the subsequent power control operation is performed in the scheduling mode illustrated in FIG. 4B. Therefore, the manual mode is optional.

When the manual mode has not been set in step 403 or the manual mode is a one-off operation set by the BS operator, the controller 357 performs power control in the scheduling mode in step 415.

FIG. 4B will be described below with reference to FIGS. 5A and 5B. FIGS. 5A and 5B are graphs referred to for describing a compensation parameter according to an exemplary embodiment of the present invention.

Referring to FIG. 4B, the parameter setter 353 updates the minimum required voltage for the amplifier 310 using the compensation parameter under the control of the controller 357 in step 417. The compensation parameter is set to increase a minimum required voltage 501 by an increment C1 when the operation voltage of the amplifier 310 is decreased as shown in FIG. 5A. Thus, the parameter setter 353 re-sets an updated minimum required voltage 503 based on the compensation parameter. In addition, the compensation parameter is set to decrease the minimum required voltage 501 by a decrement C2 when the operation voltage of the amplifier 310 is decreased as shown in FIG. 5B. Thus, the parameter setter 353 re-sets the updated minimum required voltage 503 based on the compensation parameter. While a higher compensation parameter (i.e., a higher absolute value of a compensation parameter) may lead to less power saving for the amplifier 310, the compensation parameter is used to ensure stability against an instantaneous traffic variation during power control, that is, to prevent ping-ponging during power control. It is to be noted that different compensation parameters are applied to voltage increases and decreases as illustrated in FIGS. 5A and 5B. Step 417, in which the minimum required voltage is updated using the compensation parameter, may be optional.

In step 419, the controller 357 determines whether it is time to control the operation voltage of the amplifier 310 according to a control period. In an exemplary embodiment of the present invention, the start and end times of the scheduling mode may be preset so that the scheduling mode is performed only during a predefined time period. That is, the operation period of the scheduling mode may be preset and an operation voltage control period may be set within the operation period such that the scheduling mode is performed at every predefined interval. It is also possible to perform the scheduling mode non-periodically within the operation period according to a traffic variation. The parameter setter 353 may set parameters related to the control period of the operation voltage of the amplifier 310 based on a value received from the BS operator, or the controller 357 may update the parameters periodically or non-periodically, taking into account a traffic variation. As the control operation of the operation voltage of the amplifier 310 is shorter, the operation voltage of the amplifier 310 may be controlled more adaptively to traffic variation.

If it is time to control the operation voltage of the amplifier 310 in step 419, the controller 357 determines whether the current operation voltage of the amplifier 310 is equal to the minimum required voltage in step 421. If the current operation voltage is equal to the minimum required voltage, the controller 357 sets the operation voltage of the amplifier 310 to the minimum required voltage in step 423 and then returns to step 417. If the current operation voltage is not equal to the minimum required voltage in step 421, the controller 357 determines whether the current operation voltage is higher than the minimum required voltage in step 425. If the current operation voltage is higher than the minimum required voltage, the controller 357 controls the voltage controller 351 to decrease the operation voltage of the amplifier 310 by a predefined level in step 427. If the current operation voltage is lower than the minimum required voltage, the controller 357 controls the voltage controller 351 to increase the operation voltage of the amplifier 310 by a predefined level in step 429.

FIG. 6 is a graph illustrating results of a simulation performed to verify a power consumption effect of a power control method according to an exemplary embodiment of the present invention.

Referring to FIG. 6, reference numeral 601 denotes a curve illustrating normal power consumption without power control and reference numeral 603 denotes a curve illustrating power consumption when power control is performed. As noted from FIG. 6, since the operation voltage of an amplifier of a BS is controlled adaptively according to a traffic variation, power can be conserved from the amplifier of the BS according to an exemplary embodiment of the present invention.

The above-described power control method according to an exemplary embodiment of the present invention can be implemented in hardware or as software or computer code that can be stored in a recording medium such as a Read-Only Memory (ROM), a Random-Access Memory (RAM), a Compact Disc (CD)-ROM, a magnetic tape, a floppy disc, a hard disk, a Flash memory, or a magneto-optical disk or downloaded over a network, so that the methods described herein can be rendered in such software using a general purpose computer, or a special processor or in programmable or dedicated hardware, such as an Application Specific Integrated Circuit (ASIC) or a Field Programmable Gate Array (FPGA). As would be understood in the art, the computer, the processor or the programmable hardware include memory components, e.g., a RAM, a ROM, a Flash memory, and the like, that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A power control method of a Base Station (BS) in a wireless communication system, the method comprising:
    comparing an operation voltage of a power controlled component in the BS with a minimum required voltage for the power controlled component in the BS, the minimum required voltage being set based on traffic variation to reduce power consumption in the BS;
    decreasing the operation voltage of the power controlled component in the BS by a predefined level, if the operation voltage is higher than the minimum required voltage; and
    increasing the operation voltage of the power controlled component in the BS by a predefined level, if the operation voltage is lower than the minimum required voltage.

2. The method of claim 1, further comprising updating the minimum required voltage using a compensation parameter set based on an instantaneous traffic variation.

3. The method of claim 1, wherein the method is performed periodically in a predefined time zone.

4. The method of claim 3, wherein the time zone is predefined according to a traffic variation.

5. The method of claim 1, further comprising forcedly setting the operation voltage of the power controlled component in the BS to a predefined voltage according to a specific condition.

6. The method of claim 5, further comprising maintaining a current operation voltage of the power controlled component in the BS, if the predefined voltage is lower than the minimum required voltage.

7. A power control apparatus of a Base Station (BS) in a wireless communication system, the apparatus comprising:
    a voltage comparator for comparing an operation voltage of a power controlled component in the BS with a minimum required voltage for the power controlled component in the BS, the minimum required voltage being set based on traffic variation to reduce power consumption in the BS; and
    a controller for decreasing the operation voltage of the power controlled component in the BS by a predefined level, if the operation voltage is higher than the minimum required voltage, and for increasing the operation voltage of the power controlled component in the BS by a predefined level, if the operation voltage is lower than the minimum required voltage.

8. The apparatus of claim 7, wherein the controller controls updating of the minimum required voltage using a compensation parameter set based on an instantaneous traffic variation.

9. The apparatus of claim 7, wherein the controller controls the operation voltage of the power controlled component in the BS periodically in a predefined time zone.

10. The apparatus of claim 9, wherein the time zone is predefined according to a traffic variation.

11. The apparatus of claim 7, wherein the controller controls forced setting of the operation voltage of the power controlled component in the BS to a predefined voltage according to a specific condition.

12. The apparatus of claim 11, wherein the controller controls maintaining of a current operation voltage of the power controlled component in the BS, if the predefined voltage is lower than the minimum required voltage.

13. At least one non-transitory processor readable recording medium for storing a computer program of instructions configured to be readable by at least one processor for instructing the at least one processor to execute a computer process for performing the method as recited in claim 1.

* * * * *